(12) United States Patent
Oomura (10) Patent No.: US 7,857,209 B2
(45) Date of Patent: Dec. 28, 2010

(54) PRINT SYSTEM, INFORMATION PROCESSING APPARATUS, PRINT LOG INFORMATION EXTRACTION METHOD, AND PROGRAM

(75) Inventor: Hiroshi Oomura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 875 days.

(21) Appl. No.: 11/755,218

(22) Filed: May 30, 2007

(65) Prior Publication Data

US 2007/0279674 A1 Dec. 6, 2007

(30) Foreign Application Priority Data

May 30, 2006 (JP) ............... 2006-150442

(51) Int. Cl.
*G06K 5/00* (2006.01)
*G06F 17/00* (2006.01)

(52) U.S. Cl. ...................... 235/380; 235/375

(58) Field of Classification Search ............ 235/380, 235/375, 486, 487, 383, 462.01, 472.01
See application file for complete search history.

(56) References Cited

U.S. PATENT DOCUMENTS

| | | | |
|---|---|---|---|
| 6,536,037 B1 * | 3/2003 | Barrese et al. | 717/151 |
| 7,128,270 B2 * | 10/2006 | Silverbrook et al. | 235/472.01 |
| 7,165,041 B1 * | 1/2007 | Guheen et al. | 705/26 |
| 7,668,836 B2 * | 2/2010 | Fung et al. | 1/1 |
| 2004/0107125 A1 * | 6/2004 | Guheen et al. | 705/7 |
| 2004/0117784 A1 * | 6/2004 | Endoh | 717/169 |
| 2006/0158689 A1 * | 7/2006 | Iwase et al. | 358/1.15 |

FOREIGN PATENT DOCUMENTS

| | | |
|---|---|---|
| JP | 2002-149371 A | 5/2002 |
| JP | 2003-288327 A | 10/2003 |
| JP | 2003-330677 A | 11/2003 |
| JP | 2004-118243 A | 4/2004 |
| JP | 2004-252784 A | 9/2004 |

* cited by examiner

*Primary Examiner*—Thien M Le
(74) *Attorney, Agent, or Firm*—Rossi, Kimms & McDowell LLP

(57) ABSTRACT

A print system that reduces a transfer amount and a storage amount of data and thus can realize efficient extraction of character string information. A tracking information storage server 1000 stores tracking data format set in correspondence with each print module name of applications 201 in advance. A job tracking function section 400 acquires a print module name of an application 201, reads a tracking data format that is set in correspondence to the acquired module name, extracts the tracking data from contents of a printout in accordance with the read tracking data format, stores the extracted tracking data in the tracking information storage server 1000, and enables a user to search and read the stored tracking data.

9 Claims, 7 Drawing Sheets

PRINT SYSTEM, INFORMATION PROCESSING APPARATUS, PRINT LOG INFORMATION EXTRACTION METHOD, AND PROGRAM

BACKGROUND OF THE INVENTION

1. Field of the Invention

The present invention relates to a print system, an information processing apparatus, a print log information extraction method and a program. More particularly, the present invention relates to a print system which stores the contents of a printout that is printed by a printing apparatus as print log information, an information processing apparatus constituting the print system, a print log information extraction method that is applied to the print system or the information processing apparatus, and a program for causing a computer to execute the print log information extraction method.

2. Description of the Related Art

In recent years, as a result of advances with respect to digitization, networking, and mobilization of information processing, it has become possible to access a vast amount of information at one time, and furthermore the portability of information has also improved exponentially. Accompanying these advances, there is a demand for suitable countermeasures to prevent information leakage (compromise).

When considering the kinds of confidential information that should be prevented from information leakage, it is necessary to include not only information that is vast in quantity, as typified by the customer information of large enterprises, but also information that although small in quantity is qualitatively important. Since the latter kind of confidential information can be easily taken out as a printout, a countermeasure that takes into consideration the prevention of information leakage through printing also is desirable.

For network print systems in which a client PC (Personal Computer) and a printer are connected by a network and the printer performs printing in response to a request from the client PC, the following conventional techniques exist for the purpose of preventing information leakage.

(1) A technique which sets print permission information in advance for document or print data to be printed, and then refers to that print permission information when performing printing based on the document or print data in question (for example, see Japanese Laid-Open Patent Publication (Kokai) No. 2004-252784).

(2) A technique which performs user authentication beforehand when a user utilizes a printer connected to a network (for example, see Japanese Laid-Open Patent Publication (Kokai) No. 2003-288327).

(3) A technique in which a print server that is connected to a network holds print data in a state in which the print data can be reprinted and also acquires information such as the job name, client name and user name. The technique then adds a time stamp and generates bit map data from the print data, and stores this information as a print log (for example, see Japanese Laid-Open Patent Publication (Kokai) No. 2002-149371).

(4) A technique which, in addition to the technique described in (3), acquires a print log on the printer side also and stores the print log in the print server (for example, see Japanese Laid-Open Patent Publication (Kokai) No. 2003-330677).

(5) A technique in which, simultaneous to the reception of print data from a client, a print server also receives information that can uniquely identify the user. The print server then generates a print log based on this print data and the user information so that the user can search, read, and reprint the log information (for example, see Japanese Laid-Open Patent Publication (Kokai) No. 2004-118243).

According to the above described techniques (1) and (2), it is possible to prevent an unauthorized user from printing out information.

According to the above described techniques (3) to (5), histories such as the information that is printed out, the date and the user are stored and administrators can search the histories. Accordingly, since the source of an information leakage can be easily identified if an information leakage is brought to light, the techniques serve as deterrents with respect to information leakages.

In a network print system as described above in which an information leakage prevention technique is applied, the log information (print log) of a printout is extracted. Examples of a method for extracting a print log include a character extracting method that extracts character information included in a print page, and a page image extracting method that extracts a print page image. A print log that is extracted in this manner is stored, and when an information leakage is brought to light, the stored print log is subjected to search processing to thereby enable identification of the source of the information leakage.

According to the above described character extracting method, the stored data amount of which is small and is easy to search. However, when using an application program (print application program) that renders characters with images or the like, characters cannot be extracted.

On the other hand, according to the above described page image extracting method, even if an application program that renders characters with images is used, character information can be extracted, there is the problem that the data amount is large. There is also the problem that it is necessary to additionally execute character recognition processing in order to extract character information.

SUMMARY OF THE INVENTION

The present invention provides a print system that reduces a transfer amount and a storage amount of data and thus can realize efficient extraction of character string information, an information processing apparatus, a print log information extraction method, and a program.

Accordingly, in a first aspect of the present invention, there is provided a print system that stores contents of a printout that is printed by a printing apparatus as print log information, comprising a holding unit adapted to hold information regarding extraction formats of print log information that are set in correspondence with each module name of a plurality of print application programs in advance, an acquiring unit adapted to acquire a module name of a print application program that is used when generating the printout, a reading unit adapted to read from the holding unit an extraction format of print log information corresponding to the module name that is acquired by the acquiring unit, an extracting unit adapted to extract print log information from contents of the printout in accordance with the extraction format of the print log information that is read by the reading unit, a storing unit adapted to store the print log information that is extracted by the extracting unit in a storage apparatus, and a searching and reading unit adapted to enable a user to search and read the print log information that is stored in the storage apparatus.

Accordingly, in a second aspect of the present invention, there is provided an information processing apparatus that is connected to a printing apparatus through a network, and that requests the printing apparatus to print and also stores contents of a printout that is printed by the printing apparatus as print log information, comprising a holding unit adapted to hold information regarding extraction formats of print log information that are set in correspondence with each module name of a plurality of print application programs in advance, an acquiring unit adapted to acquire a module name of a print application program that is used when generating the printout, a reading unit adapted to read from the holding unit an extraction format of print log information corresponding to the module name that is acquired by the acquiring unit, an extracting unit adapted to extract print log information from contents of the printout in accordance with the extraction format of the print log information that is read by the reading unit, a storing unit adapted to store the print log information that is extracted by the extracting unit in a storage apparatus.

Accordingly, in a third aspect of the present invention, there is provided a print log information extraction method that is applied to a print system that stores contents of a printout that is printed by a printing apparatus as print log information, the method having the steps of acquiring a module name of a print application program that is used when generating the printout, referring to a holding unit adapted to hold information of extraction formats of print log information that are set in correspondence with each module name of a plurality of print application programs in advance, and reading an extraction format of print log information corresponding to the module name that is acquired, extracting print log information from contents of the printout in accordance with the extraction format of the print log information that is read, and storing the print log information that is extracted in a storage apparatus.

Accordingly, in a fourth aspect of the present invention, there is provided a print log information extraction method that is applied to an information processing apparatus that is connected to a printing apparatus through a network and that requests the printing apparatus to print and also stores contents of a printout that is printed by the printing apparatus as print log information, the method having the steps of acquiring a module name of a print application program that is used when generating the printout, referring to a holding unit adapted to hold information of extraction formats of print log information that are set in correspondence with each module name of a plurality of print application programs in advance, and reading an extraction format of print log information corresponding to the module name that is acquired, extracting print log information from contents of the printout in accordance with the extraction format of the print log information that is read, and storing the print log information that is extracted in a storage apparatus.

Accordingly, in a fifth aspect of the present invention, there is provided a program that is stored in a computer-readable storage medium and that causes a computer to implement a print log information extraction method that is applied to a print system that stores contents of a printout that is printed by a printing apparatus as print log information, the print log information extraction method having the steps of acquiring a module name of a print application program that is used when generating the printout, referring to a holding unit adapted to hold information of extraction formats of print log information that are set in correspondence with each module name of a plurality of print application programs in advance, and reading an extraction format of print log information corresponding to the module name that is acquired, extracting print log information from contents of the printout in accordance with the extraction format of the print log information that is read, and storing the print log information that is extracted in the extracting step in a storage apparatus.

According to the present invention, it is possible to set a print log extraction object to at least either characters or a page image in accordance with the print application program to thereby reduce the transfer amount and the storage amount of data and thus realize efficient extraction of character string information.

The above and other objects, features, and advantages of the invention will become more apparent from the following detailed description taken in conjunction with the accompanying drawings.

DETAILED DESCRIPTION OF THE PREFERRED EMBODIMENTS

Preferred embodiments for implementing the present invention will now be described with reference to the drawings.

Figure 1:
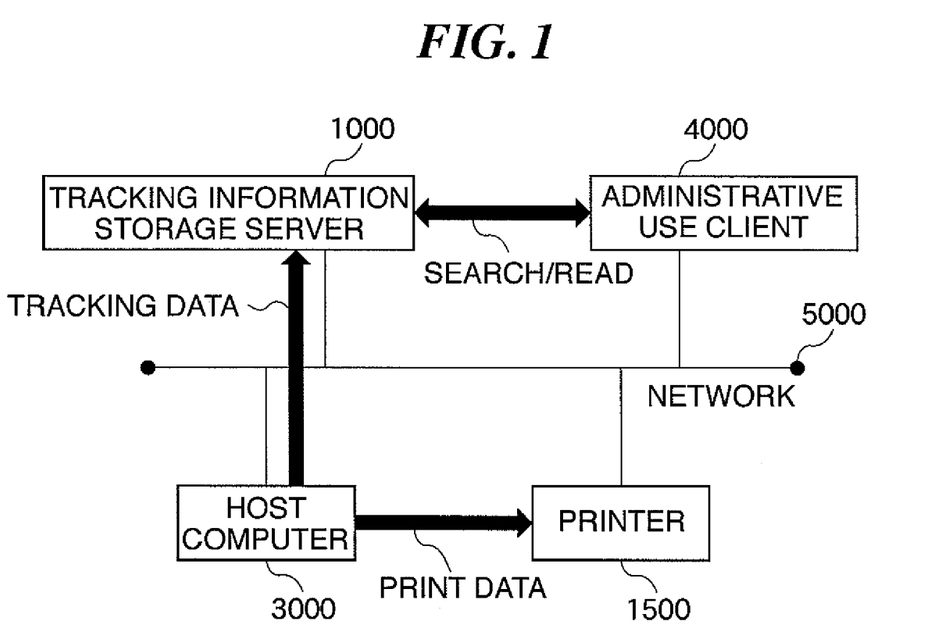
FIG. 1 is a block diagram showing the configuration of a print system according to one embodiment of the present invention.

FIG. 1 is a block diagram showing the configuration of a print system according to one embodiment of the present invention.

The present print system is comprised of a host computer 3000, a printer 1500, a tracking information storage server 1000, and an administrative use client 4000 that are connected to a network 5000.

The host computer 3000 receives a print request from a user, generates print data in accordance with the contents of the print request, and transmits the print data to the printer 1500. The host computer 3000 also performs extraction and generation of tracking data that corresponds to the print request, and transmits the tracking data to the tracking information storage server 1000.

The printer 1500 executes printing in accordance with the print data transmitted from the host computer 3000.

The tracking information storage server 1000 registers and stores the tracking data transmitted from the host computer 3000 in a database of a memory area that is constructed inside the tracking information storage server 1000 itself or inside another information device.

The administrative use client 4000 is used to search and read tracking data that is registered inside the database when required by a system administrator.

The administrative use client 4000 may be the same information device as the tracking information storage server 1000.

Figure 2:
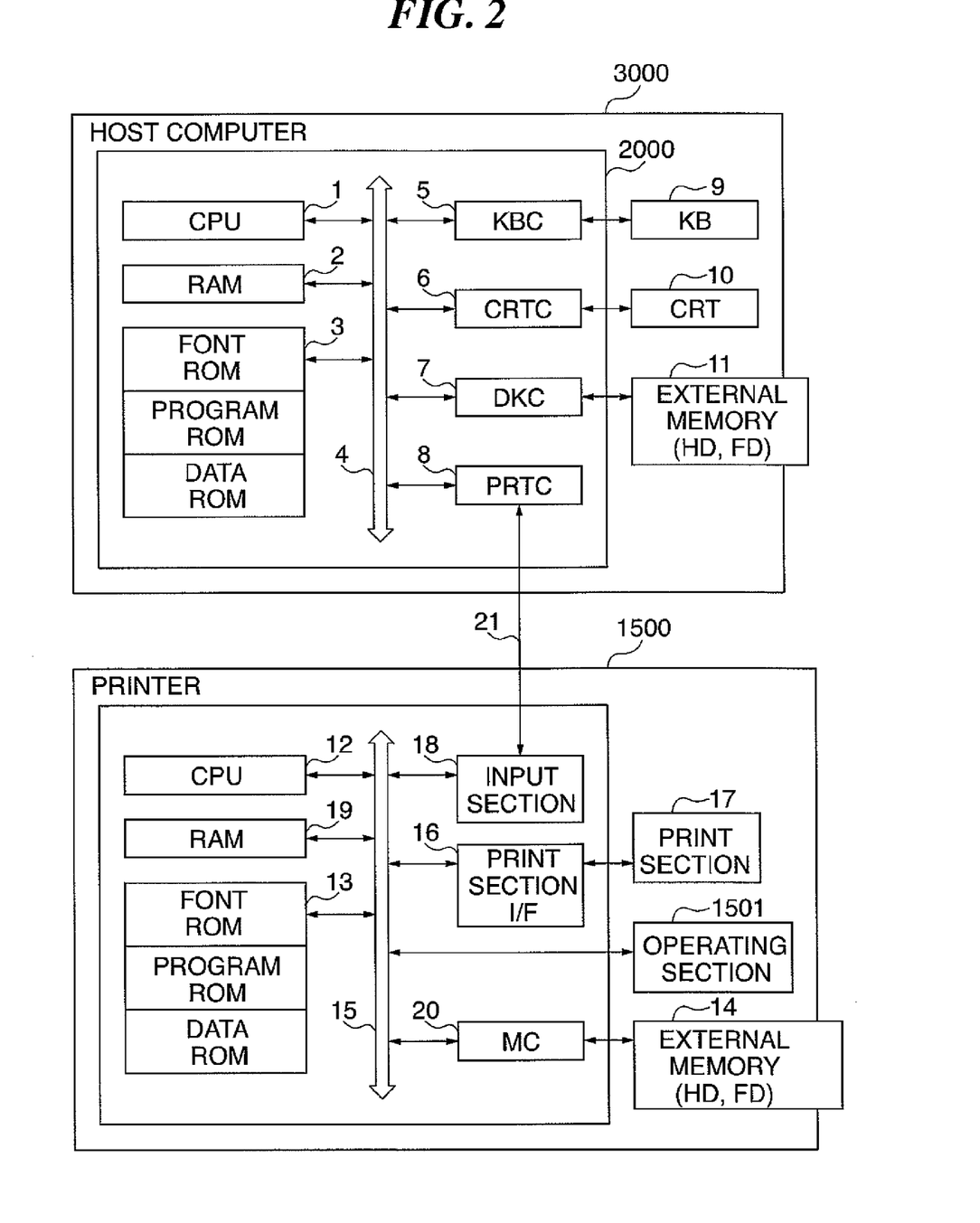
FIG. 2 is a block diagram showing the configuration of a host computer and a printer shown in FIG. 1.

FIG. 2 is a block diagram that illustrates the configuration of the host computer 3000 and the printer 1500 that are shown in FIG. 1.

The host computer 3000 comprises a CPU 1 that executes processing of documents in which graphics, images, characters, tables (including spreadsheets etc.) and the like are mixed based on a document processing program or the like, and also executes print processing based thereon. Further, the CPU 1 performs overall control of each device that is connected to a system bus 4.

A ROM 3 comprises a font ROM, a program ROM, and a data ROM. In addition to the above described document processing program, an operating system program (hereinafter, referred to as "OS") that is a control program for the CPU 1 is stored in the program ROM of the ROM 3 or an external memory 11. Further, font data and the like that is used when executing the above described document processing is stored in the font ROM of the ROM 3 or the external memory 11. Furthermore, various data that is used when executing the above described document processing and the like is stored in the data ROM of the ROM 3 or the external memory 11.

A RAM 2 functions as the main memory and work area and the like of the CPU 1.

A keyboard controller (KBC) 5 performs input processing for signals that are input from a keyboard (KB) 9 or an unshown pointing device. A CRT controller (CRTC) 6 controls image display by a CRT display (CRT) 10. A disk controller (DKC) 7 controls access to the external memory 11 such as a hard disk (HD) and a floppy® disk (FD). In the external memory 11 are stored a boot program, various applications, font data, user files, edit files, a program for generating printer control commands (hereinafter, referred to as "printer driver") and the like. A printer controller (PRTC) 8 is connected to the printer 1500 through a bidirectional interface 21, and executes communication control processing with the printer 1500.

Based on commands designated by a user by operating a cursor or the like displayed on the CRT 10 using a pointing device, the CPU 1 opens various pre-registered windows and executes various kinds of data processing. When executing printing, the CPU 1 opens a window relating to print settings and the use can make the settings for a print processing method with respect to the printer driver including printer settings or selecting a print mode.

The printer 1500 is controlled by a CPU 12. The CPU 12 outputs an image signal as print output information to a print section (printer engine) 17 through a print section I/F 16 based on a control program or the like.

A ROM 13 comprises a font ROM, a program ROM and a data ROM. A control program of the CPU 12 and the like are stored in the program ROM of the ROM 13. Font data and the like that is used when generating the above print output information is stored in the font ROM of the ROM 13. Further, in the case of a printer for which an external memory 14 such as a hard disk does not exist, information and the like to be used by the CPU 12 is stored in the data ROM of the ROM 13.

The CPU 12 executes communication processing that is performed between the printer 1500 and the host computer 3000 through an input section 18. It is thereby possible to notify the host computer 3000 of information inside the printer 1500.

A RAM 19 functions as the main memory and work area and the like of the CPU 12. The RAM 19 is also used as an output information development region, an environment data storage region, an NV (Non Volatile) RAM and the like. By connecting an optional RAM to an unshown expansion port, the memory capacity can be expanded.

The external memory 14 is comprised of a hard disk (HD), a floppy® disk (FD), an IC card or the like. Access to the external memory 14 is controlled by a memory controller (MC) 20. The external memory 14 is connected optionally, and stores font data, emulation programs, form data or the like.

An operating section 1501 comprises operation switches, a LED display device and the like that are provided on an operation panel (not shown).

The print section 17 comprises, for example, an electrophotographic printing apparatus. More specifically, the print section 17 is a device in which toner is recorded on a medium such as paper based on print data. In this connection, the print section 17 may be an inkjet type printing apparatus or the like instead of an electrophotographic printing apparatus.

The printer 1500 may have an NVRAM, and may store printer mode settings information that is input through the operating section 1501 in the NVRAM.

Figure 3:
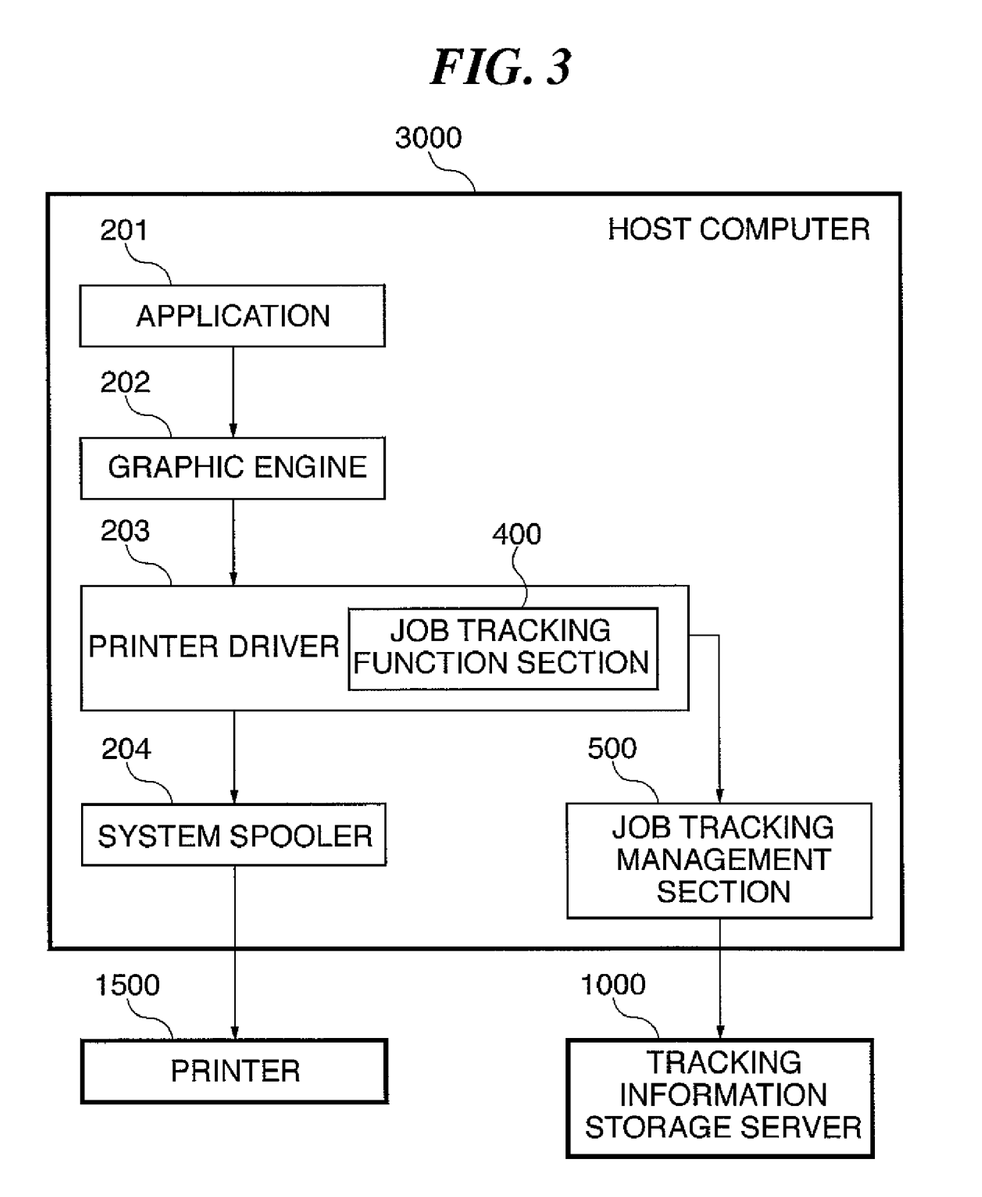
FIG. 3 is a view showing the configuration of program modules used for print processing executed by the host computer shown in FIG. 1.

FIG. 3 is a view showing the configuration of program modules used in print processing executed by the host computer 3000 shown in FIG. 1.

An application 201, a graphic engine 202, a printer driver 203, and a system spooler 204 are stored as files in the external memory 11. These program modules are then loaded into a RAM 2 by the operating system (OS) or a module that utilizes the modules, and thus are implemented. The application 201 and the printer driver 203 can be added to the HD of the external memory 11 from a FD or a CD-ROM, or through the network 5000.

The application 201 that is stored in the external memory 11 is loaded into the RAM 2 to be executed. When causing the printer 1500 to perform printing, the application 201 utilizes the graphic engine 202 similarly loaded into the RAM 2 such that the graphic engine 202 can be executed to perform output (rendering).

The graphic engine 202 loads a printer driver 203 that is prepared for each printing apparatus such as the printer 1500 into the RAM 2 from the external memory 11 and sets the application 201 to output to the printer driver 203. The graphic engine 202 also converts a GDI (Graphic Device Interface) function received from the application 201 into a DDI (Device Driver Interface) function, and outputs the DDI function to the printer driver 203. The printer driver 203 converts the DDI function received from the graphic engine 202 into a printer control command that is recognizable by the printer 1500, for example, into a PDL (Page Description Language). The converted printer control command passes through the system spooler 204 that is loaded into the RAM 2 by the OS, and is output as print data to the printer 1500 via the aforementioned interface 21.

The print system according to the present embodiment also has a job tracking function section 400 inside the printer driver 203. The job tracking function section 400 may include a built-in module of the printer driver 203 or may include a library module that is added by an independent installation.

At the printer driver 203, extraction and generation of tracking data is performed by execution of the job tracking function section 400, and the tracking data is sent to a job tracking management section 500.

The job tracking management section 500 receives the tracking data, and then transfers the data to the tracking information storage server 1000. As necessary, the job tracking management section 500 may process or select and sort the received tracking data. Further, the job tracking management section 500 may transmit the received tracking data to the tracking information storage server 1000 simultaneously with receipt of the tracking data. Furthermore, the job tracking management section 500 may temporarily store the received tracking data in a memory area of the hard disk or the like, and transmits the tracking data to the tracking information storage server 1000 in accordance with a separately designated schedule for transmitting to the tracking information storage server 1000.

[Job Tracking Print Processing]

The host computer 3000 has a job tracking print processing function. This function will be described with reference to FIG. 4.

Figure 4:
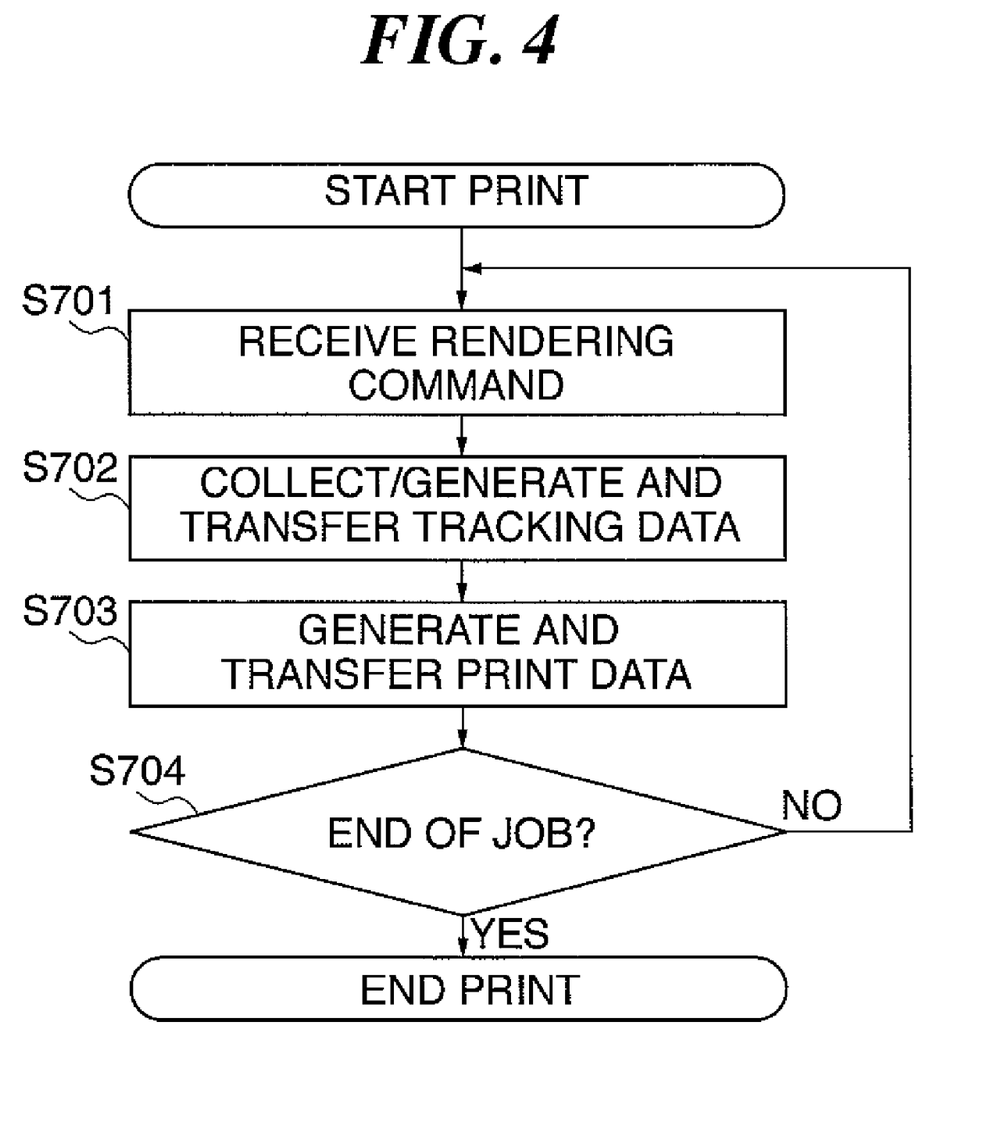
FIG. 4 is a flowchart showing job tracking print processing executed by the host computer shown in FIG. 1.

FIG. 4 is a flowchart showing job tracking print processing executed by the host computer 3000.

When a print job starts, at step S701, the printer driver 203 receives a rendering command (DDI command).

At step S702, the printer driver 203 and the job tracking function section 400 collect or generate tracking data in accordance with the received rendering command and transfer the tracking data to the job tracking management section 500.

More specifically, for example, if the received rendering command is a print start command, attribute information relating to the print job or information regarding the environment in which printing is to be performed or the like is used as the tracking data. On the other hand, if the received rendering command is a page start command, attribute information relating to that page or the like is used as tracking data.

Extraction of text information or extraction of a page image is designated for the job tracking function section 400. When text information extraction is designated for the job tracking function section 400, character string information or the like is extracted from a text rendering command for use as tracking data. When page image extraction is designated for the job tracking function section 400, rendering as a bitmap image is performed in a memory region or the like that retains each rendering command.

Further, the job tracking function section 400 acquires the print execution module name of the application 201 and switches the method for extracting the extraction data in accordance with the module name. More specifically, the job tracking function section 400 performs switching between extraction methods such as methods to 1) extract as text information, 2) extract as a page image, 3) not extract at all, and 4) extract as both text information and a page image. The method for determining the extraction method will be described later referring to FIG. 7.

Thus, the job tracking function section 400 executes processing that is dependent on the received rendering command and various settings (text information extraction or page image extraction) that are designated at the job tracking function section 400, collects and generates tracking data, and transfers the tracking data that is obtained to the job tracking management section 500.

After collection, generation, and transfer of tracking data is performed in this manner, at step S703, print data (a control command that is recognizable by the printer 1500) that is in accordance with the rendering command that is received at step S701 is generated. The print data that is generated is then written to the system spooler 204 and transferred to the printer 1500.

Each of the processes of receiving a rendering command (S701), collecting, generating, and transferring tracking data (S702), and generating and transferring print data (S703) as described above are repeatedly executed until an end-of-job command is issued (step S704).

[Job Tracking Processing Function User Interface]

Figure 5:
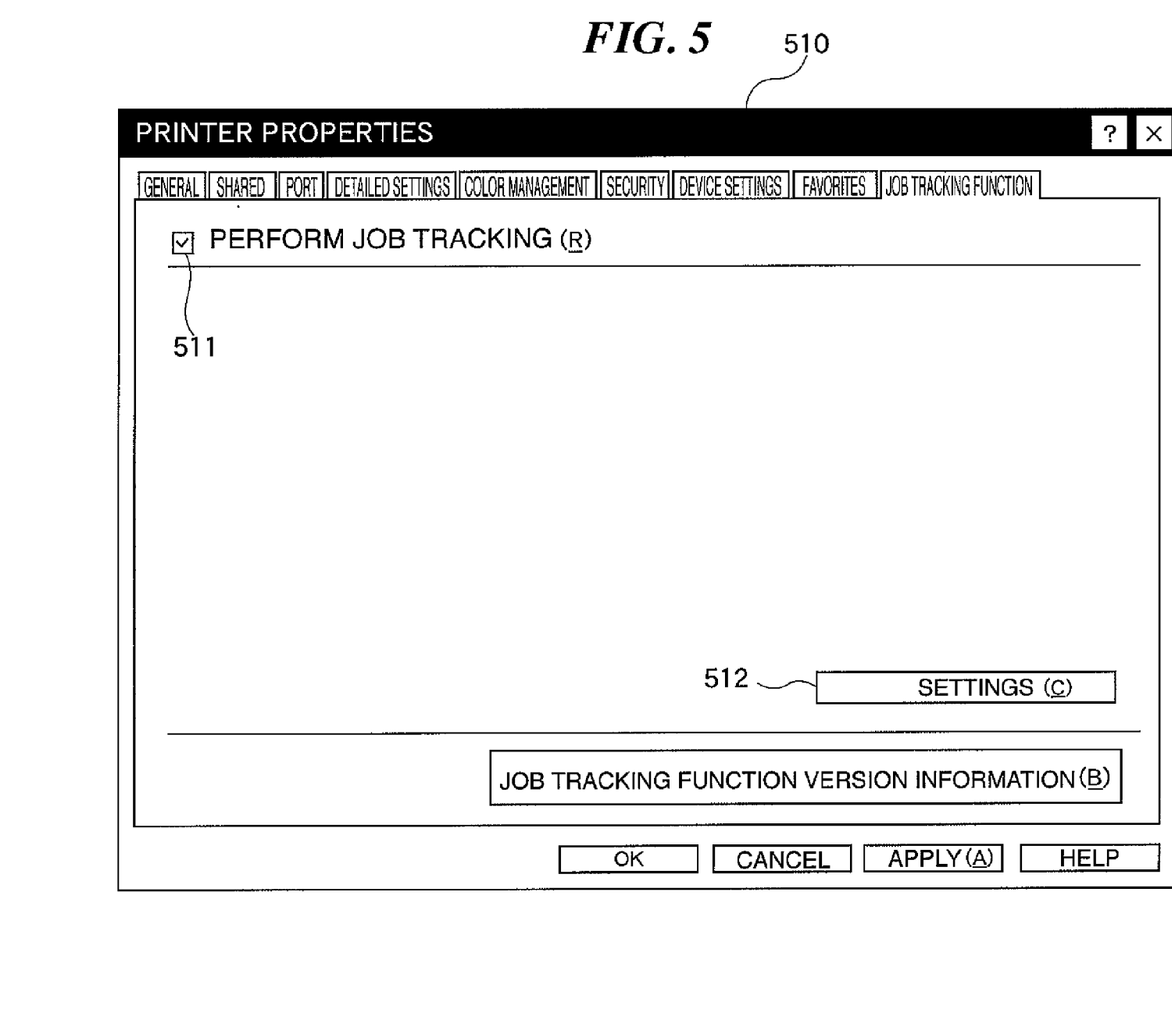
FIG. 5 is a view showing an initial display screen of a user interface relating to job tracking provided in an add-in UI control section inside a printer driver shown in FIG. 3.
Figure 6:
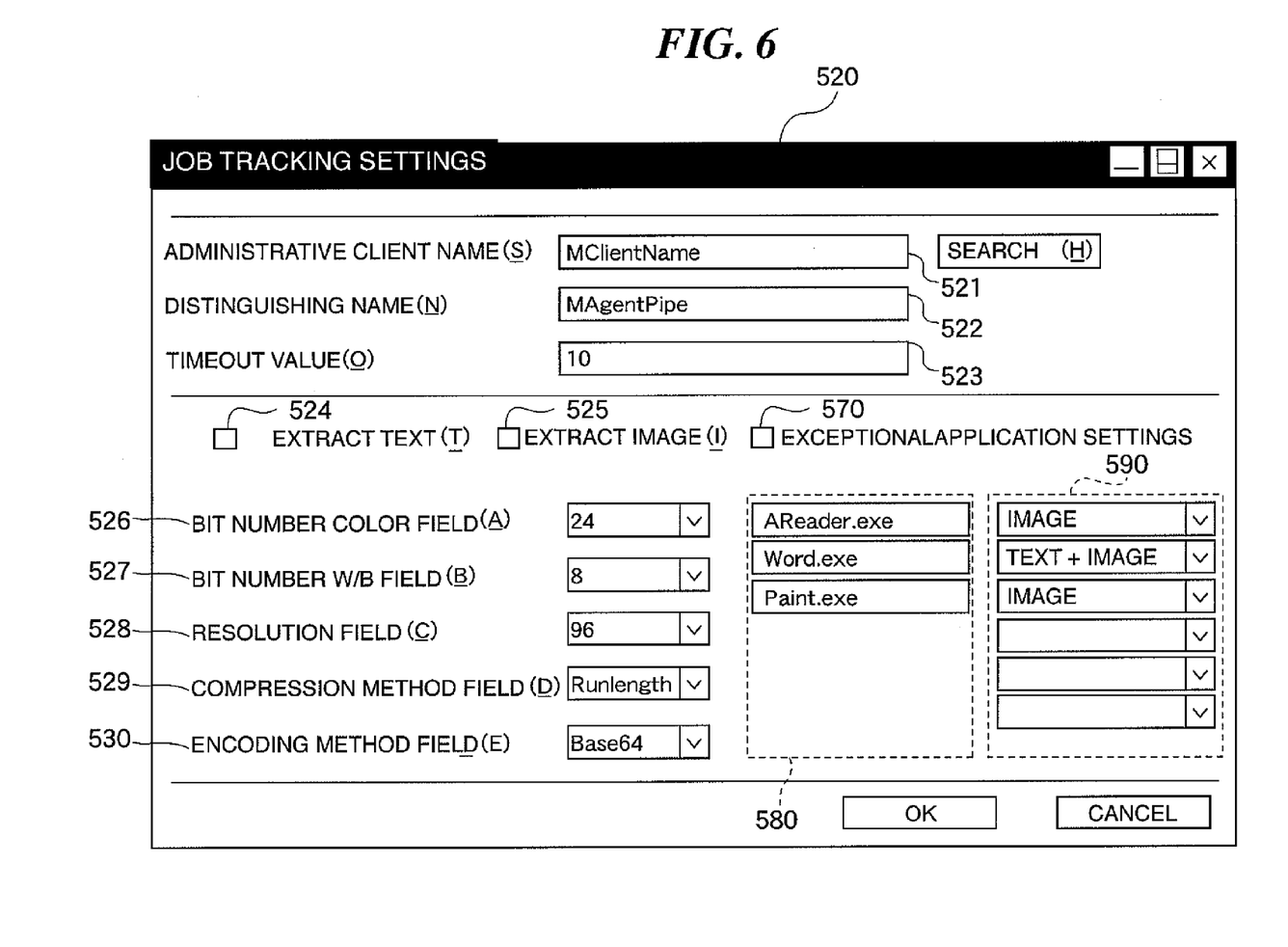
FIG. 6 is a view showing a dialog for performing detailed setting of a job tracking function displayed by selecting a settings button shown in FIG. 5.

FIG. 5 and FIG. 6 are views that show a user interface to enable a user to make setting relating to job tracking print processing.

FIG. 5 is a view showing an initial display screen of a user interface relating to job tracking provided in an add-in UI control section inside the printer driver 203.

This screen shows the properties of the printer 1500, and is configured such that a user can perform settings relating to job tracking in the "job tracking function" tab inside a dialog 510.

In this connection, from the point of view of the application object of the present print system, it is desirable that a configuration of the dialog 510 is adopted such that this dialog 510 is displayed only to users that are authorized to perform settings changes with respect to the printer in question. Therefore, a configuration is adopted which requires a user to receive authorization by means of a password or the like when opening the dialog 510, or which limits an executing user's authority.

In FIG. 5 a "perform job tracking" checkbox 511 is a checkbox for designating whether to enable or disable the job tracking function. The user can enable the present function by inputting a check in the checkbox 511.

FIG. 6 is a view showing a dialog 520 for performing detailed setting of the job tracking function displayed by selecting a settings button 512 shown in FIG. 5.

This job tracking settings dialog 520 is mainly used to determine the information for transmitting tracking data as well as the contents of tracking data to be generated at the job tracking function section 400.

The user enters the identifying name of the computer that is executing the job tracking management section 500 in an administrative client name input field 521, and enters a key for distinguishing the connection from other connections inside the job tracking management section 500 in a distinguishing name input field 522. In a timeout value input field 523, the user previously sets a timeout time to be used when communicating with the job tracking management section 500. The above three items are the information using for transmitting tracking data.

In this connection, if the job tracking management section 500 is being executed with a computer that is displaying the job tracking settings dialog 520, the distinguishing name of the computer in question is set in the administrative client name input field 521. If the job tracking management section 500 is being executed with a different computer, the distinguishing name of the different computer on which the job tracking management section 500 is being executed is set.

An "extract text" checkbox 524 is a checkbox that designates whether or not to include text character string information in the tracking data. When a check is entered in the checkbox 524, the printer driver 203 extracts text character string information as tracking data. By adding the extracted text character string information to the tracking data, it is possible to easily implement text searches after the tracking data is stored in the tracking information storage server 1000.

An "extract image" checkbox 525 is a checkbox that designates whether or not to include page bitmap information in the tracking data. When a check is entered in the checkbox 525, the printer driver 203 generates a page bitmap other than the print data. By adding the generated page bitmap to the tracking data, it is possible to inspect an image after the tracking data is stored in the tracking information storage server 1000.

Using a bit number color field 526, a bit number W/B field 527, a resolution field 528, a compression method field 529, and an encoding method field 530, the user can designate in detail the attributes or format of a page image to be generated.

According to the present embodiment, an "exceptional application settings" checkbox 570 and exceptional application registration information fields 580 and 590 are provided. When the "exceptional application settings" checkbox 570 is checked, it becomes possible to enter the print execution module name of the application 201 in the edit box 580. Further, in the edit box 590, the user can set each of the desired tracking data formats in correspondence with each print execution module that is entered in the edit box 580. In this case, the setting is any of the following: 1) extract neither text nor images; 2) extract text; 3) extract images; or 4) extract both text and images. When a print execution module that is entered in the edit box 580 is executed, extraction of tracking data is performed in accordance with the corresponding tracking data format that is set in the edit box 590.

A configuration may also be adopted in which the settings screens relating to job tracking that are shown in FIG. 5 and FIG. 6 are displayed on a dedicated tool other than the printer driver 203, and the settings information is transmitted to the add-in UI control section inside the printer driver 203.

[Method of Determining Tracking Data Extraction Format in Accordance with Print Module of Application]

Figure 7:
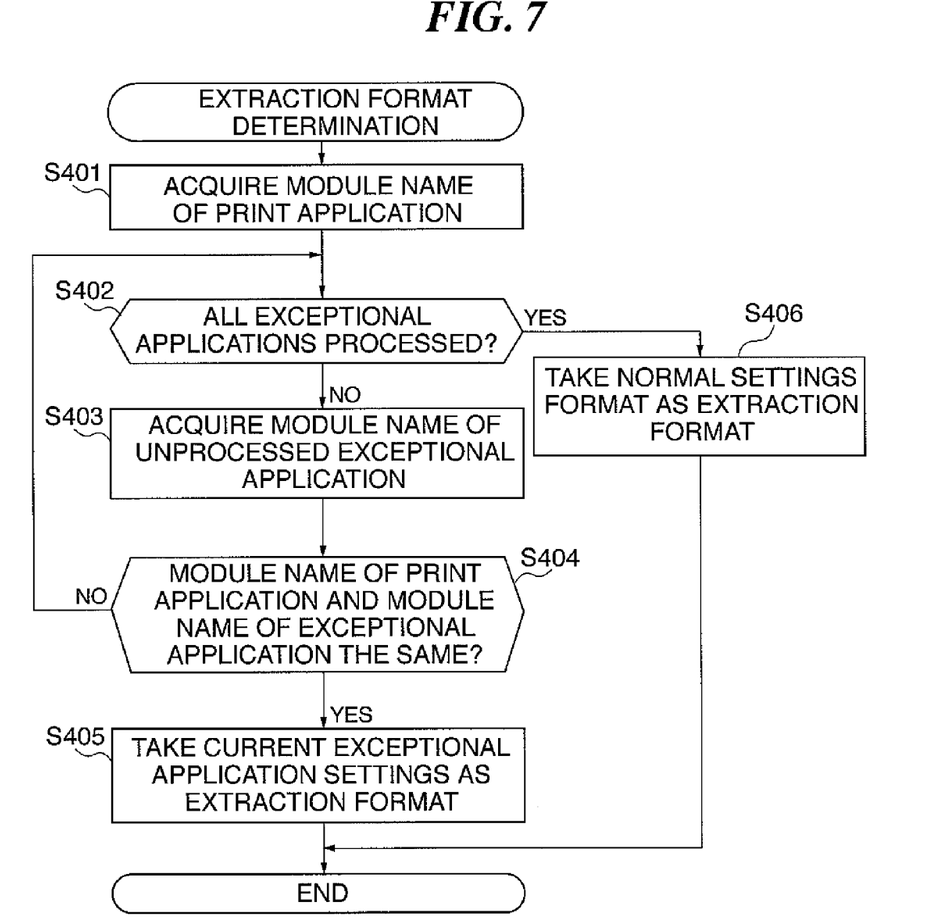
FIG. 7 is a flowchart showing determination processing for the format for extracting tracking data that is executed by a job tracking function section.

FIG. 7 is a flowchart showing processing that determines the format for extracting tracking data executed at the job tracking function section 400.

At step S401, the job tracking function section 400 acquires the print module name of the application 201.

At step S402, the job tracking function section 400 determines whether or not print execution modules (exceptional applications) having the names that are inputted in the edit box 580 shown in FIG. 6 have all been processed. If there is still a print execution module remaining to be processed, the operation proceeds to step S403. In contrast, if all the print execution modules have been processed, the operation proceeds to step S406.

At step S403, the job tracking function section 400 acquires the name of the print execution module (exceptional application) that is not yet processed.

At step S404, the job tracking function section 400 determines whether or not the module name of the print application that is currently executing printing is the same as the name of the print execution module (exceptional application) that is acquired at step S403. If the names are the same, the operation proceeds to step S405. In contrast, if the names are different, the operation returns to step S402 to take the next unprocessed print execution module (exceptional application) as the judgment object.

At step S405, the job tracking function section 400 takes the tracking data format that is set in correspondence to the module name of the print execution module (exceptional application) that is acquired at step S403 as the tracking data extraction format, and terminates the present determination processing.

At step S406, the job tracking function section 400 determines that the print application that is currently executing printing is not designated as an exceptional application in the edit box 580. Therefore, the job tracking function section 400 takes the setting designated in the checkbox 524 and/or the checkbox 525 shown in FIG. 6 as the tracking data extraction format, and terminates the present determination processing.

Thus, according to the present embodiment, it is possible to set the object for extraction of tracking data (print log) to at least either characters or a page image in accordance with the print application program. More specifically, by extracting text character string information as tracking data, it is possible to easily implement a text search after the tracking data is stored in the tracking information storage server 1000. Further, by generating a page bitmap (page image) other than the print data and adding the page bitmap to the tracking data, it is possible to inspect the image after the tracking data is stored in the tracking information storage server 1000.

Thus, the transfer amount and storage amount of data is reduced and thus efficient extraction of character string information can be realized.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitutes the present invention.

Examples of the storage medium for supplying the program code include a floppy® disk, a hard disk, a magnetic-optical disk, optical disks such as a CD-ROM, a CD-R, a CD-RW, a DVD-ROM, a DVD-RAM, a DVD-RW, and a DVD+RW, a magnetic tape, a non-volatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-150442 filed May 30, 2006, which is hereby incorporated by reference herein in its entirety.

What is claimed is:

1. A print system comprising:
   a holding unit adapted to hold information regarding a plurality of extraction formats of print log information that are set in correspondence with each module name of a plurality of print application programs in advance;
   an acquiring unit adapted to acquire a module name of a print application program that is used when generating a printout printed by a printing apparatus;
   a reading unit adapted to read from said holding unit an extraction format of the plurality of extraction formats, the read extraction format corresponding to the module name that is acquired by said acquiring unit;
   an extracting unit adapted to extract print log information from contents of the printout in accordance with the read extraction format that is read by said reading unit;
   a storing unit adapted to store, in a storage apparatus, the extracted print log information that is extracted by said extracting unit; and
   a searching and reading unit adapted to enable a user to search and read the extracted print log information that is stored in said storage apparatus.

2. The print system according to claim 1, wherein the read extraction format is an extraction format for execution of at least one of the group consisting of character extraction and page image extraction.

3. An information processing apparatus that is connected to a printing apparatus through a network, and that requests the printing apparatus to print, the information processing apparatus comprising:
   a holding unit adapted to hold information regarding a plurality of extraction formats of print log information that are set in correspondence with each module name of a plurality of print application programs in advance;
   an acquiring unit adapted to acquire a module name of a print application program that is used when generating a printout printed by the printing apparatus;
   a reading unit adapted to read from said holding unit an extraction format of the plurality of extraction formats, the read extraction format corresponding to the module name that is acquired by said acquiring unit;
   an extracting unit adapted to extract print log information from contents of the printout in accordance with the read extraction format that is read by said reading unit;
   a storing unit adapted to store, in a storage apparatus, the extracted print log information that is extracted by said extracting unit.

4. The information processing apparatus according to claim 3, wherein the read extraction format is an extraction format for execution of at least one of the group consisting of character extraction and page image extraction.

5. The information processing apparatus according to claim 3, further comprising a searching and reading unit adapted to enable a user to search and read the extracted print log information that is stored in said storage apparatus.

6. A print log information extraction method that is applied to a print system, the method comprising the steps of:
   acquiring a module name of a print application program that is used when generating a printout printed by a printing apparatus;
   referring to a holding unit adapted to hold information regarding a plurality of extraction formats of print log information that are set in correspondence with each module name of a plurality of print application programs in advance, and reading an extraction format of the plurality of extraction formats, the read extraction format corresponding to the module name that is acquired in said acquiring step;
   extracting print log information from contents of the printout in accordance with the read extraction format that is read in said referring and reading step; and
   storing, in a storage apparatus, the extracted print log information that is extracted in said extracting step.

7. A print log information extraction method that is applied to an information processing apparatus that is connected to a printing apparatus through a network and that requests the printing apparatus to print, the method comprising the steps of:
   acquiring a module name of a print application program that is used when generating a printout printed by the printing apparatus;
   referring to a holding unit adapted to hold information regarding a plurality of extraction formats of print log information that are set in correspondence with each module name of a plurality of print application programs in advance, and reading an extraction format of the plurality of extraction formats, the read extraction format corresponding to the module name that is acquired in said acquiring step;
   extracting print log information from contents of the printout in accordance with the read extraction format that is read in said referring and reading step; and
   storing, in a storage apparatus, the extracted print log information that is extracted in said extracting step.

8. The print log information extraction method according to claim 6, wherein the read extraction format is an extraction format for execution of at least one of the group consisting of character extraction and page image extraction.

9. A non-transitory computer-readable storage medium storing a program that, when executed by a computer, causes the computer to implement a print log information extraction method that is applied to a print system, the print log information extraction method comprising the steps of:
   acquiring a module name of a print application program that is used when generating a printout printed by a printing apparatus;
   referring to a holding unit adapted to hold information regarding a plurality of extraction formats of print log information that are set in correspondence with each module name of a plurality of print application programs in advance, and reading an extraction format of the plurality of extraction formats, the read extraction format corresponding to the module name that is acquired in said acquiring step;
   extracting print log information from contents of the printout in accordance with the read extraction format that is read in said referring and reading step; and
   storing, in a storage apparatus, the extracted print log information that is extracted in said extracting step.

* * * * *